United States Patent
Ghosh et al.

(10) Patent No.: US 11,431,897 B1
(45) Date of Patent: Aug. 30, 2022

(54) CONTEXT-BASED DETACHABLE MODULAR CAMERA SYSTEM

(71) Applicant: International Business Machines Corporation, Armonk, NY (US)

(72) Inventors: Partho Ghosh, Kolkata (IN); Sarbajit K. Rakshit, Kolkata (IN); Saraswathi Sailaja Perumalla, Visakhapatnam (IN); Venkata Vara Prasad Karri, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/449,339

(22) Filed: Sep. 29, 2021

(51) Int. Cl.
*H04N 5/232* (2006.01)
*H04N 5/225* (2006.01)
*G05B 13/02* (2006.01)
*H02J 7/00* (2006.01)

(52) U.S. Cl.
CPC ....... *H04N 5/23222* (2013.01); *H04N 5/2253* (2013.01); *H04N 5/23299* (2018.08); *H04N 5/232933* (2018.08); *G05B 13/0265* (2013.01); *H02J 7/0042* (2013.01)

(58) Field of Classification Search
CPC ........... H04N 5/23222; H04N 5/23299; H04N 5/232933; G05B 13/0265; H02J 7/0042
USPC ................................................... 348/333.02
See application file for complete search history.

(56) References Cited

U.S. PATENT DOCUMENTS

| | | | | |
|---|---|---|---|---|
| 7,252,265 B2* | 8/2007 | Perlo | ...................... | H04M 1/21 244/17.23 |
| 7,957,765 B1* | 6/2011 | Causey | ............... | H04M 1/0256 455/556.1 |
| 8,345,429 B2* | 1/2013 | Kim | ...................... | G06F 1/1692 361/729 |
| 10,084,897 B2* | 9/2018 | Sainvil | ................. | H04N 5/2254 |
| 10,303,165 B2* | 5/2019 | Kim | ...................... | G08C 17/02 |
| 10,494,094 B2* | 12/2019 | Foley | ...................... | B64C 27/08 |
| 10,510,261 B2* | 12/2019 | Sugaya | ............... | G08G 5/0069 |
| 10,530,982 B2* | 1/2020 | Daulton | .................... | G01S 3/00 |
| 10,579,108 B2* | 3/2020 | Dilaura | ............... | H04M 1/0264 |
| 10,718,996 B2* | 7/2020 | Ramones | ......... | G08B 13/19619 |
| 10,880,421 B2 | 12/2020 | Fan | | |
| 10,944,893 B1 | 3/2021 | Daulton | | |

(Continued)

FOREIGN PATENT DOCUMENTS

CN 111938615 A 11/2020

OTHER PUBLICATIONS

Disclosed Anonymously, "Drone Embedded Phone Camera," ip.com, Apr. 6, 2021, https://priorart.ip.com/IPCOM/000265404.

(Continued)

*Primary Examiner* — Pritham D Prabhakher
(74) *Attorney, Agent, or Firm* — Mark Bergner

(57) ABSTRACT

A camera system comprises a camera system interface (CSI). The CSI comprises a user interface for receiving user input from a user, and providing user output to a user, and a communication interface. The camera system also comprises a detachable positionable camera module (DPCM) that is detachable from and re-attachable to the CSI and is positionable in three-dimensional space and orientable about multiple axes. The DPCM is automatically detachable and re-attachable from the CSI based on a current context that triggers detachment of the DPCM.

20 Claims, 4 Drawing Sheets

(56) References Cited

U.S. PATENT DOCUMENTS

| | | | | |
|---|---|---|---|---|
| 10,948,908 | B2* | 3/2021 | Tanabe | B64C 39/02 |
| 11,050,917 | B2* | 6/2021 | Daulton | H04N 5/23296 |
| 11,292,598 | B2* | 4/2022 | Foley | B64C 39/028 |
| 2006/0038059 | A1* | 2/2006 | Perlo | B64C 27/20 |
| | | | | 244/17.23 |
| 2010/0208434 | A1* | 8/2010 | Kim | H04N 5/23206 |
| | | | | 361/729 |
| 2017/0272112 | A1* | 9/2017 | DiLaura | A45C 11/38 |
| 2017/0369164 | A1 | 12/2017 | Klein | |
| 2018/0046176 | A1* | 2/2018 | Kim | B64D 47/08 |
| 2018/0077272 | A1* | 3/2018 | Sainvil | H04N 5/2253 |
| 2019/0199907 | A1* | 6/2019 | Daulton | G06F 1/1686 |
| 2019/0250677 | A1* | 8/2019 | Dilaura | H04M 1/0264 |
| 2020/0106946 | A1* | 4/2020 | Daulton | H04N 5/23218 |

OTHER PUBLICATIONS

Harress, C., "Here's what the future of insect and nano drones looks like [video]," published Jan. 9, 2014, https://www.ibtimes.com/heres-what-future-insect-nano-drones-looks-video-1532592, retrieved from internet on Aug. 3, 2021.

Hitti, Natashah. "Amazon Launches Autonomous Flying Security Camera for the Home." Dezeen, Sep. 30, 2020, www.dezeen.com/2020/09/30/amazon-ring-always-home-cam-drone-security-camera/. retrieved from the internet on Aug. 3, 2021.

Jackson, Rory. "Small Is Beautiful: Nano Drone Tech Is Advancing." Defence IQ, Jul. 20, 2017, https://www.defenceiq.com/defence-technology/articles/nano-drone-tech-is-advancing. Retrieved from internet on Sep. 29, 2021.

Kim, Kee-Eung & Chang, Wook & Cho, Sung-Jung & Shim, Junghyun & Lee, Hyunjeong & Park, Joonah & Lee, Youngbeom & Kim, Sangryoung. (2006). Hand Grip Pattern Recognition for Mobile User Interfaces.. 2, https://www.researchgate.net/publication/221605320_Hand_Grip_Pattern_Recognition_for_Mobile_User_Interfaces.

Krishna, Sai. "Xiaomi Design Patent Shows Detachable Rear Camera Used to Take Selfies." 91Mobiles, Jan. 29, 2021, www.91mobiles.com/hub/xiaomi-design-patent-detachable-rear-camera/, retrieved from internet on Aug. 3, 2021.

Meet Your Pocket Size Aerial Photographer. Airselfie, airselfiecamera.com/. retrieved from internet on Aug. 3, 2021.

Schneider, Jaron. "Prototype Smartphone from Vivo Has a Removable Pop-up Camera." PetaPixel, Oct. 14, 2014, petapixel.com/2020/10/14/prototype-smartphone-from-vivo-has-a-removable-pop-up-camera/.

Sharma, Ravi. "OPPO Patent Shows Smartphone with Detachable Camera Module." 91Mobiles, Dec. 5, 2020, www.91mobiles.com/hub/oppo-smartphone-detachable-camera-module-patent/. retrieved from internet on Aug. 3, 2021.

Vivo Unveils Phone with Detachable Camera That Can Be Remote Controlled. Digit, Digit NewsDesk, Oct. 12, 2020, www.digit.in/news/mobile-phones/vivo-unveils-phone-with-detachable-camera-that-can-be-remote-controlled-56789.html, retrieved from internet on Aug. 3, 2021.

* cited by examiner

CONTEXT-BASED DETACHABLE MODULAR CAMERA SYSTEM

BACKGROUND

Disclosed herein is a system and related method for a context-based detachable camera module system, and more particularly to such a camera module system that may have a camera module that automatically detaches from a camera system interface. The camera module may comprise camera sub-modules that may detach from each other when they are detached from the camera system interface and positioned in three-dimensional space.

Photo and video capture functions are some of the most-often used features of mobile devices such as smartphones. Modern mobile devices are equipped with integrated high-resolution cameras, which enable users to capture images and share them easily with other users. The images produced by such cameras can be of relatively high quality when captured in a well-illuminated environment.

SUMMARY

According to some embodiments, a camera system comprises a camera system interface (CSI). The CSI comprises a user interface for receiving user input from a user, and providing user output to a user, and a communication interface. The camera system also comprises a detachable positionable camera module (DPCM) that is detachable from the CSI and is positionable in three-dimensional space and orientable about multiple axes. The DPCM is automatically detachable from the CSI based on a current context that triggers detachment of the DPCM.

According to some embodiments, a method for operating a camera system comprises determining a current context of a camera system. The camera system comprises a camera system interface (CSI) and a detachable positionable camera module (DPCM) comprising a lens and an image sensor that is physically detachable and re-attachable from the CSI. The DPCM is independently positionable from the CSI in three-dimensional space and orientable about multiple axes when detached. The DPCM is automatically detachable or re-attachable from or to the CSI. When the DPCM is detached from the CSI, the DPCM is positionable and orientable independently of the CSI.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain a mechanism for storing, communicating, propagating or transporting the program for use, by, or in connection, with the instruction execution system, apparatus, or device.

BRIEF DESCRIPTION OF THE DRAWINGS

Various embodiments are described herein with reference to different subject-matter. In particular, some embodiments may be described with reference to methods, whereas other embodiments may be described with reference to apparatuses and systems. However, a person skilled in the art will gather from the above and the following description that, unless otherwise notified, in addition to any combination of features belonging to one type of subject-matter, also any combination between features relating to different subject-matter, in particular, between features of the methods, and features of the apparatuses and systems, are considered as to be disclosed within this document.

The aspects defined above, and further aspects disclosed herein, are apparent from the examples of one or more embodiments to be described hereinafter and are explained with reference to the examples of the one or more embodiments, but to which the invention is not limited. Various embodiments are described, by way of example only, and with reference to the following drawings.

DETAILED DESCRIPTION

The following general acronyms may be used below:
API application program interface
ARM advanced RISC machine
CD-ROM compact disc ROM
CPU central processing unit
DPS data processing system
DVD digital versatile disk
EPROM erasable programmable read-only memory
FPGA field-programmable gate arrays
I/O input/output
ISA instruction-set-architecture
LAN local-area network
PDA personal digital assistant
PLA programmable logic arrays
RAM random access memory
RISC reduced instruction set computer
ROM read-only memory
SRAM static random-access memory
WAN wide-area network Table 1

General Acronyms

Data Processing System in General

Figure 1:
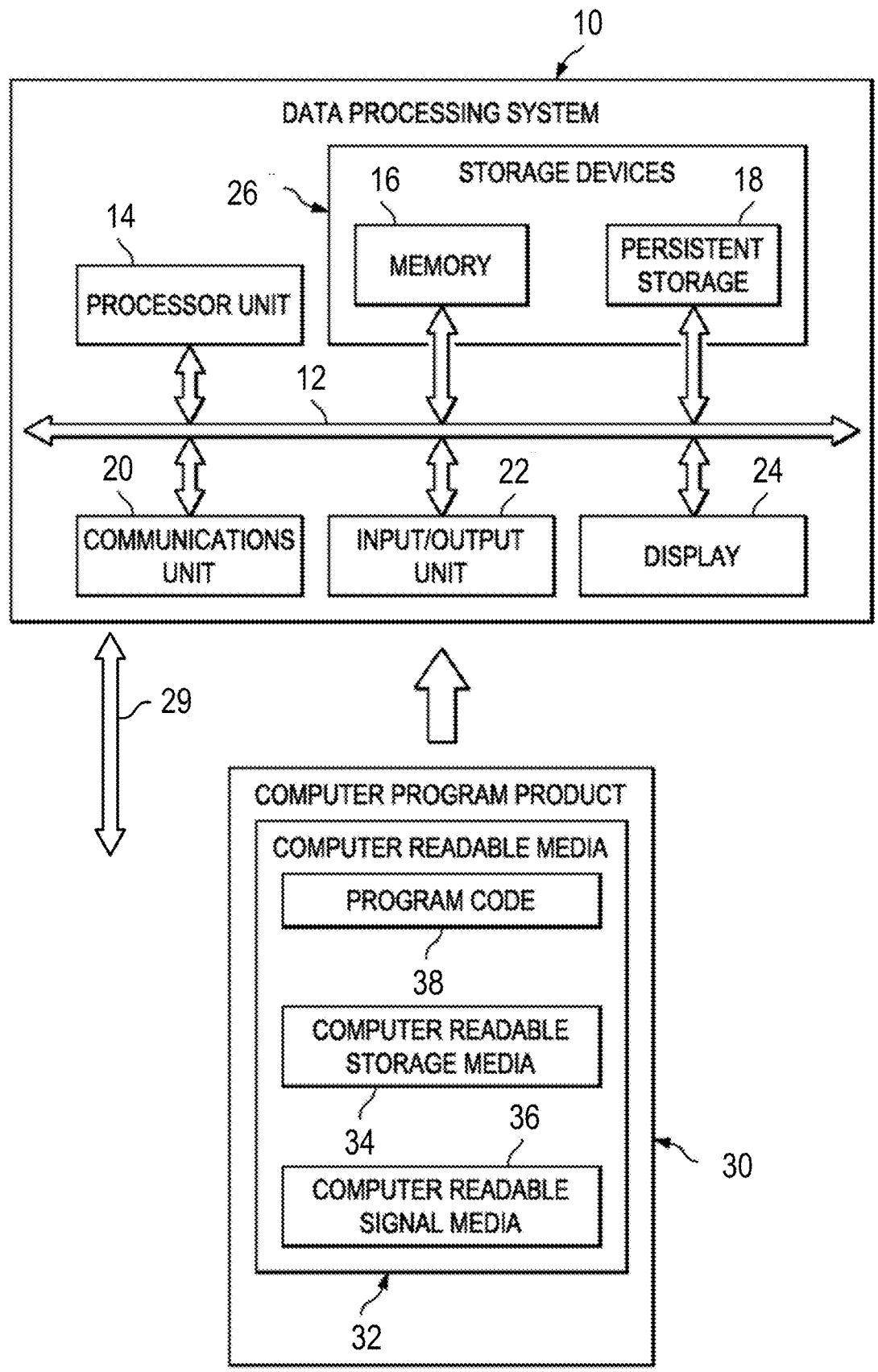
FIG. 1 is a block diagram of a data processing system (DPS) according to one or more embodiments disclosed herein.

FIG. 1 is a block diagram of an example DPS according to one or more embodiments. In this illustrative example, the DPS 10 may include communications bus 12, which may provide communications between a processor unit 14, a memory 16, persistent storage 18, a communications unit 20, an I/O unit 22, and a display 24.

The processor unit 14 serves to execute instructions for software that may be loaded into the memory 16. The processor unit 14 may be a number of processors, a multi-core processor, or some other type of processor, depending on the particular implementation. A number, as used herein with reference to an item, means one or more items. Further, the processor unit 14 may be implemented using a number of heterogeneous processor systems in which a main processor is present with secondary processors on a single chip. As another illustrative example, the processor unit 14 may be a symmetric multi-processor system containing multiple processors of the same type.

The memory 16 and persistent storage 18 are examples of storage devices 26. A storage device may be any piece of hardware that is capable of storing information, such as, for example without limitation, data, program code in functional form, and/or other suitable information either on a temporary basis and/or a permanent basis. The memory 16, in these examples, may be, for example, a random access memory or any other suitable volatile or non-volatile storage device. The persistent storage 18 may take various forms depending on the particular implementation.

For example, the persistent storage 18 may contain one or more components or devices. For example, the persistent storage 18 may be a hard drive, a flash memory, a rewritable optical disk, a rewritable magnetic tape, or some combination of the above. The media used by the persistent storage 18 also may be removable. For example, a removable hard drive may be used for the persistent storage 18.

The communications unit 20 in these examples may provide for communications with other DPSs or devices. In these examples, the communications unit 20 is a network interface card. The communications unit 20 may provide communications through the use of either or both physical and wireless communications links.

The input/output unit 22 may allow for input and output of data with other devices that may be connected to the DPS 10. For example, the input/output unit 22 may provide a connection for user input through a keyboard, a mouse, and/or some other suitable input device. Further, the input/output unit 22 may send output to a printer. The display 24 may provide a mechanism to display information to a user.

Instructions for the operating system, applications and/or programs may be located in the storage devices 26, which are in communication with the processor unit 14 through the communications bus 12. In these illustrative examples, the instructions are in a functional form on the persistent storage 18. These instructions may be loaded into the memory 16 for execution by the processor unit 14. The processes of the different embodiments may be performed by the processor unit 14 using computer implemented instructions, which may be located in a memory, such as the memory 16. These instructions are referred to as program code 38 (described below) computer usable program code, or computer readable program code that may be read and executed by a processor in the processor unit 14. The program code in the different embodiments may be embodied on different physical or tangible computer readable media, such as the memory 16 or the persistent storage 18.

The DPS 10 may further comprise an interface for a network 29. The interface may include hardware, drivers, software, and the like to allow communications over wired and wireless networks 29 and may implement any number of communication protocols, including those, for example, at various levels of the Open Systems Interconnection (OSI) seven layer model.

FIG. 1 further illustrates a computer program product 30 that may contain the program code 38. The program code 38 may be located in a functional form on the computer readable media 32 that is selectively removable and may be loaded onto or transferred to the DPS 10 for execution by the processor unit 14. The program code 38 and computer readable media 32 may form a computer program product 30 in these examples. In one example, the computer readable media 32 may be computer readable storage media 34 or computer readable signal media 36. Computer readable storage media 34 may include, for example, an optical or magnetic disk that is inserted or placed into a drive or other device that is part of the persistent storage 18 for transfer onto a storage device, such as a hard drive, that is part of the persistent storage 18. The computer readable storage media 34 also may take the form of a persistent storage, such as a hard drive, a thumb drive, or a flash memory, that is connected to the DPS 10. In some instances, the computer readable storage media 34 may not be removable from the DPS 10.

Alternatively, the program code 38 may be transferred to the DPS 10 using the computer readable signal media 36. The computer readable signal media 36 may be, for example, a propagated data signal containing the program code 38. For example, the computer readable signal media 36 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, the program code 38 may be downloaded over a network to the persistent storage 18 from another device or DPS through the computer readable signal media 36 for use within the DPS 10. For instance, program code stored in a computer readable storage medium in a server DPS may be downloaded over a network from the server to the DPS 10. The DPS providing the program code 38 may be a server computer, a client computer, or some other device capable of storing and transmitting the program code 38.

The different components illustrated for the DPS 10 are not meant to provide architectural limitations to the manner in which different embodiments may be implemented. The different illustrative embodiments may be implemented in a DPS including components in addition to or in place of those illustrated for the DPS 10.

Computer Readable Media

The present invention may be a system, a method, and/or a computer readable media at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention are presented for purposes of illustration, but are not intended to be exhaustive or limited to the embodiments disclosed. Many modifications and variations will be apparent to those of ordinary skill in the art without departing from the scope and spirit of the described embodiments. The terminology used herein has been chosen to best explain the principles of the embodiments, the practical application or technical improvement over technologies found in the marketplace, or to enable others of ordinary skill in the art to understand the embodiments disclosed herein.

Context-Based Detachable Camera Module

The following application-specific acronyms may be used below:

TABLE 2

| Application-Specific Acronyms | |
|---|---|
| AI | artificial intelligence |
| AR | augmented reality |
| CI | communications interface |
| CSI | camera system interface |
| CSM | camera sub-module |
| DPCM | detachable positionable camera module |
| MI | machine intelligence |
| PSM | peripheral sub-module |
| SM | sub-module |
| UI | user interface |
| USB | Universal Serial Bus |
| VR | virtual reality |

A method and system are described herein by which a mobile device camera is able to determine a context of the user and the user's intent. The camera is detachable from the mobile device and may comprise camera sub-components that may each be cameras themselves and are detachable from and re-attachable to one another, and this may be done based on a context. The camera sub-components are able to detach from one another into one or more portions in mid-air to capture an image or a context of an image capturing need.

At present, various problems exist cameras of mobile devices. These may include, but are not limited to the following. Present mobile devices require the use of a "selfie stick" in order to capture certain view perspectives. They have a limited scope of aerial, landscape, and other types of shots for photographs or videography. The have a limited field of view and limited range of camera angle or the desired angular direction for an image may not be practical. Mobile cameras may have a blind spot. Furthermore, the image quality may suffer when lighting is not optimal. In addition, a lack of providing an optimal distance from the camera and the user might require moving an entire group or moving a subject to get the desired perspective (e.g., wide angle view, etc.). Finally, the small fixed lenses with small apertures that are typical of mobile device cameras may limit the quality of captured images and the creativity of the user.

In general, the capabilities of mobile device cameras are lacking when compared with the capabilities of dedicated digital cameras. However, in order to use an enhanced camera, changes may be required to the entire display device of the mobile device. Thus, it may be desirable to provide a method and system that are able to determine a contextual need of initiating mid-air detachability of camera modules and/or to detach camera modules from the display device based on user inputs, such as user input on a touch screen, user input via a gesture when the camera modules are mid-air, and/or a triggering event that may indicate an image capturing need.

Figure 2:
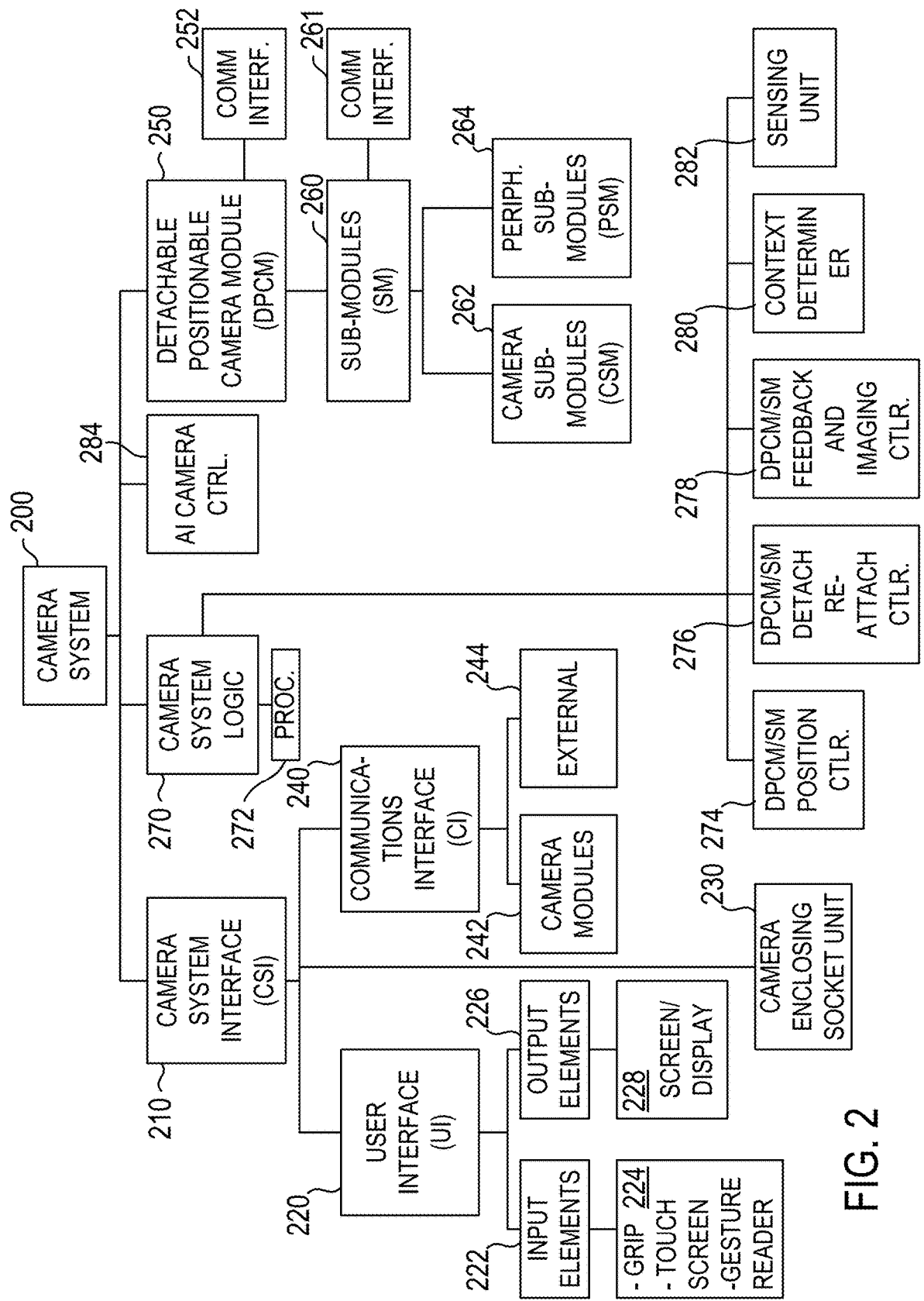
FIG. 2 is a block diagram of the component hierarchy in the camera system, according to some embodiments.

FIG. 2 is a block diagram that illustrates various components of a camera system 200 described herein. The camera system 200 may comprise, in some embodiments, three primary components: a camera system interface (CSI) 210, a detachable positionable camera module (DPCM) 250, and camera system logic 270. Some of the components may be hardware, software, or a combination of both. Also, certain of the components may be located within a user device, such as a smartphone, a VR/AR device, such as wearable goggles, or the like. Alternately, some or all of the components may be located in a separate camera system 200 that has a dedicated CSI 210 that the user uses to interact with the DPCMs 250. In such a configuration, the CSI may be standalone or may interface with or be a part of the user device. For example, the camera system 200 may leverage existing features of the user device, such as its display, storage, and sharing functions, allowing the camera system 200 itself to be a relatively simple, lightweight, portable, and inexpensive device. The camera system 200 or components thereof may incorporate a DPS 100, as described above.

The CSI 210 may comprise a user interface (UI) 220, a camera enclosing socket unit 230, and a communications interface (CI) 240. The UI 220 may comprise an input part 222 having input elements 224 that receive input from a user (e.g., touch screen, keyboard, hardware or software buttons, joysticks, wheels, gesture reader (including, e.g., a camera for capturing, e.g., user gestures), sensors, including an orientation sensor, etc.). The input elements 224 may operate individually or in combination with each other. The UI 220 may further comprise an output part 226 having output elements that provide output to the user (e.g., display, haptic elements, etc.). The UI 220 may form a part of a smart wearable by the user, such as smart glasses, motion sensors, gloves, etc.

The CI 240 may comprise a camera communications portion that communicates with the camera module(s) 242 and an external system interface 244 that communicates with other devices and/or systems. For example, when the camera system 200 is physically separate from the user device, the external system interface 244 may be used to communicate with the user device. Such communications may be wired (e.g., USB connection from the camera system 200 to the user device), or wireless (Bluetooth, Wi-Fi, cellular network, etc.)—particularly with respect to the DPCM 250 and/or SMs 260.

The DPCM 250 may comprise some or all of the components of a camera, such as a sensor, high quality lens, exposure control, flash (or other illumination source), power source (battery), etc. The DPCM 250 may be in the form of a single integrated module that is detachable from the CSI 210. Alternately, the DPCM 250 may comprise multiple sub-modules (SMs) 260 that are detachable from one another. The SMs 260 may comprise camera SMs (CSMs) 262 and/or peripheral SMs (PSMs) 264. The DPCM 250 and SMs 260 may be operable when attached to the camera system 200 at, e.g., a camera enclosing socket unit 230 in addition to being operable when detached from the camera system and/or from each other.

The CSMs 262 may be full cameras similar to the camera of the DPCM 250 described above, comprising a sensor, lens, exposure control, flash, etc. Alternately, the CSM 262 be limited, comprising only certain parts of a camera, and rely upon one or more PSMs 264 for complete functionality (e.g., a PSM 264 that is a flash unit, a light sensor unit, charging battery, etc.). The DPCM 250 and/or the SMs 260 may be fully positionable within three-dimensional operational boundaries (positions), and may be oriented in various directions. The positioning may be achieved by the use of, e.g., motors, propulsion mechanisms, control surfaces, steering mechanisms, and the like.

In some embodiments, the orientation may be possible about one, two, or three axes (e.g., corresponding to roll, pitch, and yaw) of rotation. With multiple SMs 260, these may be positioned, oriented, and operated independently of one another, although they also may be able to communicate with each other and operate on data received from other SMs 260 as well as directly with the camera system 200 using the camera module communication interface 210. The DPCM 250 and the SMs 260 may each incorporate edge-based hardware and software components, including battery, three-dimensional movement and orientation capabilities, sensors, micro storage, proximity detection, anti-collision mechanisms, connectivity components to enable mid-air detachment and re-attachment, floating/hovering capability, trajectory traversing, image data relay, inter-camera synchronization, etc. These capabilities may be employed by, e.g., the user interface 220 and/or the AI camera controller 284. The DPCM 250 and the SMs 260 may each comprise their own memory for image/video storage, as well as user preferences for various configuration, imaging, and other camera settings.

The camera system logic 270 may comprise a processor 272 (which may be a shared processor associated with the user device) that is used to execute instructions for carrying out various functionalities described herein. The camera system logic may further comprise a DPCM 250/SM 260 position controller 274, a DPCM 250/SM 260 detachment/re-attachment controller 276, a DPCM 250/SM 260 feedback and image controller 278, and a context determiner 280. The position controller 274 may comprise components that receive a current position and orientation of the DPCM

250 and any SMs 260 (in the following, and for the sake of simplicity, features related to the DPCM 250 should also be inferred as applying to any SMs 260 as well). If each of these are not in a respective/desired position and/or orientation, the position controller 274 may send a command over the camera modules communication interface 242 so that the DPCM 250 moves into the desired position/orientation. If the DPCM 250 is smart, then the ultimate desired position/orientation desired may be transmitted to the DPCM 250. However, it is also possible that the position controller 274 transmits incremental position commands to the DPCM 250 to tell it how to move to the desired position/orientation, as well as controlling its speed and motion.

The camera system logic 270 may comprise elements to focus light with different level of brightness, e.g., by using sensors to determine lighter and darker areas of a scheme and using information associated with light luminance and distance from the subject. The camera system logic may also determine a color of the lights when they have controls for adjusting color (e.g., RGB, color temperature, etc.). The camera system logic 270 may also recognize the position and field of view of other SMs 260 and identify optimum relative positions so that, e.g., while capturing a photograph, no other SMs 260 are seen in the captured photograph The DPCM 250/SM 260 detachment/re-attachment controller 276 may make a determination as to whether: a) the DPCM 250 should physically detach from or re-attach to the camera system 200; and/or b) the SMs 260 should detach from or re-attach to each other while in the air. This determination may be made with the assistance of the context determiner 280, and the determination of the context may be referred to herein as "situational awareness", or "contextual need" (to detach/re-attach). The context determiner 280 may be able to determine some or all of the following (and possibly others) contexts/aspects: 1) the level of illumination that is required in the surroundings; 2) a direction of the shadow that is to be created; 3) panoramic or 3D image capturing; 4) sequencing of capturing an event and advantageous distances for such a capture; 5) consideration of a user-selected reference photograph to capture format, composition, lighting, color, etc., to identifying how the floating cameras are to be placed etc.; 6) type of image: wide angle, 360/3D degree, panoramic image, etc; 7) whether the image is a selfie and its field of view; 8) angle of image capture; 9) angle of lighting or flash based on the exposure, contrast, brightness and lighting effect; 10) collaboration between cameras; and 11) depth sensing and depth of field based on blurring or portrait capture.

Based on the type of detachment one or more arial hovering/floating triggers may be initiated. These triggers may be based on obtaining a synchronization between the camera(s)' weight distribution and floating pattern (e.g., tilted camera, high angle, vertical, etc.) of the image capturing need.

By way of example, a user is attempting to get a group picture in which the user is present. However, the camera lens does not permit the user to obtain a picture of everyone in the group when the camera device is held at arms-length or even with the aid of a selfie stick.

The context determiner 280 may determine from the number of faces in the image being monitored (more generally, the "contextual need") by the DPCM 250 in its attached status, combined with the fact that it detects others in the group are cut off in the picture, that the DPCM 250 needs to detach from the camera system 200 and reposition itself further away in order to get the entire group in the shot. Thus, the context determiner 280 may take into account the needs of the user and/or particulars of the surroundings, including, but not limited to a need for flash, camera lens particulars, field of view or background (surroundings) to be covered in image frame, presence of blind spots, etc. The context determiner 280 may utilize the sensing unit to determine, e.g., a proximity to other objects, which information may be used, e.g., to prevent collisions. The context determiner 280 may also take into account a user's intent, such as a desire for a group photograph, a landscape or portrait view, a panoramic image, and the like. This may be based on information received, e.g., from the user input 222 and/or the AI camera controller 284.

The context determiner 280 may also be able to detect and, possibly with the aid of the AI camera controller 284, be able to cure vibration (e.g., by initiating vibration dampening) as well as optical and/or electronic image stabilization. The DPCM 250 and/or SMs 260 may have a built-in lens gimbal to prevent any vibration that is caused by mid-air wind movements or mid-air floating/hovering. The context determiner 280 may further be able to provide peripheral vision, alerts, indications of connectivity disruptions, security zones and zone infringement, etc. The context determiner 280 may also determine conditions such as wind direction, user tracking trajectories, lighting conditions, etc.

The camera system 200 and the DPCM 250 may exist in various states with regard to their attachment/detachment. In one state, the DPCM 250 (including all of the SMs 260 that may make it up) are attached to the camera system 200. In another state, the DPCM 250 may be detached from the camera system 200, but the SMs 260 making up the DPCM 250 remain attached to each other. In another state, the DPCM 250 is detached from the camera system 200, and the SMs 260 making up the DPCM 250 are detached from one another. These are the primary states, however others are possible. For example, in another state, one or more of the SMs 260 detached from the camera system 200 while others remain attached to the camera system 200. In another state, the entire DPCM 250 is detached from the camera system 200, but only one or more of the SMs 260 are detached from the DPCM 250, while others remain together. Any possible combination of attachment are considered to be envisioned by various descriptions herein.

The connections may be made in a variety of ways. For example, in some embodiments, two modules (e.g., SMs 260) needing to be connected may be connected simply by positioning and orienting them in a particular way relative to each other. The connectors themselves may constitute a male-female mechanical construction, and the connection may be made by, e.g., a light friction fit based on the location of the connectors on the modules. In other embodiments, mechanical elements may be engaged once the corresponding connectors are at a certain position relative to one another.

The floating SMs 260 may collaborate with each other to identify relative positions, directions in the surrounding area, recognition of the target objects, direction of light, and use of historical data and AI learning to identify how the SMs 260 should be placed in different directions (e.g., arranged in an arc around a subject). The floating camera(s) DPCM 250, SMs 260 may collaborate and identify how the photograph will be captured as per the requirements. The SMs utilize wireless communication among themselves to establish the connections.

The context determiner 280 may then send a signal to the detachment/re-attachment controller 276 indicating the need for detachment and positioning/orientation of the DPCM

250. The detachment/re-attachment controller 276 may then instruct the DPCM 250 to detach and provide positioning and orientation coordinates.

The DPCM 250/SM 260 feedback and imaging controller may monitor imaging information being provided by the DPCM 250/SMs 260 to determine if adjustments to camera parameters (e.g., focal length, aperture, shutter speed, exposure time, etc.) are needed, and any required changes may be passed on to the DPCM 250/SMs 260.

Various embodiments disclosed herein may provide any, some, or all of the following features. Either a) a user input is received from an input mechanism 224 of the user interface 220, such as a touch screen or gesture reader, or, alternately, b) a triggering event is received, indicating a need to capture an image. The detachment/re-attachment controller 276, in conjunction with the context determiner 280, determines an attachment state of the DPCM 250 and any constituent SMs 260 with regard to the camera system 200. If the context determiner 280 and the detachment/reattachment controller 276, based on the user input or triggering event, indicates a need to change the attachment state, then the detachment/reattachment controller 276 sends a signal to the DPCM 250 and/or the SMs 260, instructing them of the new attachment state needed. The DPCM 250 and/or SMs 260 then position themselves and take the relevant actions so that mechanical connections or disconnections may be performed.

In some embodiments, a camera enclosing socket unit 230 may be incorporated in the camera system 200, which encloses all or some portion of the DPCM 250 when attached to the camera enclosing socket unit 230. The camera enclosing socket unit 230 may enable the context determiner 280, which may comprise a sensing unit 282, to determine an event that may trigger a need for detaching camera modules DPCM 250/SMs 260 from the camera system 200 or from other SMs 260. Upon such an event, the camera enclosing socket unit 230 may initiate a secure communication (input and output response) protocol and controlling events to the DPCM 250 or the SMs 260, via the camera modules 242 communication interface. The camera enclosing socket unit 230 may also provide dynamic charging of camera modules DPCM 250 or the SMs 260 when they are attached to the camera system 200. The DPCM 250 and/or the SMs 260 may, in some embodiments, provide a higher quality image and video when attached to the camera system 200 due to an increased bandwidth that may be possible by a direct connection. In sum, the camera enclosing socket unit 230 may include: 1) the detachable camera DPCM 250, SM 260 charging capability; 2) sensors/sensing unit to determine the need to detach; 3) secure communications with other camera system components; 4) controlling events of the camera; 5) relaying captured image/video feeds; 6) the holding and gripping pattern of the UI; and 7) the determination of the trajectory for takeoff/detaching and landing/reattaching.

In some embodiments, the camera enclosing socket unit 230 may operate in conjunction with the sensing unit 282, and, upon determining that a DPCM 250 or SM 260 detachment has taken place, initiates secure communications between the camera system CSI 210, the DPCM 250, and/or the SMs 260, via the CI 240. Once communications have been established, controlling events may be issued to the DPCM 250, and/or the SMs 260, via the CI 240. Also, depending on a detachment/re-attachment, a battery charging may be instructed to (or automatically) terminate/begin.

The DPCM and/or SMs 260 may be instructed to re-attach when their battery life reaches a predefined minimum threshold value.

In some embodiments, a UI input element 224 in the form of a control grip may be used to control the DPCM 250 and SMs 260. Based on a holding and gripping pattern of the user on the control grip 224, the DPCM 250 and SMs 260 may dynamically be able to correlate their motion with that of the control grip 224 in order to generate and follow the modules' 250, 260 detachment, re-attachment, position, and orientation protocol, as well as their and trajectories (e.g., vertical, angular, 3D, circular takeoff, and landing).

According to a separation protocol, by way of example, the camera system 200 may, with the camera system logic 270, use the position controller 274 and the detachment/re-attachment controller 276 to direct the DPCM 250 to detach from the camera system 200. The takeoff protocol may thus be executed and the DPCM 250 may be directed to move to a particular position, which may include a predefined height, and orientation. Once the DPCM 250 achieves this, the individual SMs 260 are then directed to detach from one another and move to their own positions and orientations. The SMs 260, e.g., flashes, may be placed at an angle or orientation to the picture or videos taken to enable angled lighting, lighting intensity/duration, etc., based on the photography needs. These directions may be fully controlled by the user via the UI input 212, or partially/fully controlled by an AI camera controller 284.

The AI camera controller 284 may take into consideration a number of factors in assisting the detachment/reattachment controller 276 and the context determiner 280. For example, the AI camera controller 284 may consider the camera specifications (e.g., number of image pixels needed, aperture, depth, focal length), type or characteristics of the desired file produced (e.g., high dynamic range photo, 4k video, frames per second, etc.), context (e.g., selfie, group photo, arial shot, etc.), and any other parameters associated with image and/or video capture. These considerations may for a basis for determining whether to detach or reattach the camera modules 250, 260. The AI camera controller 284 may enable inter-camera module mid-air synchronization based on image capture need and situational awareness.

The AI camera controller 284 may further assist in positioning and orienting the DPCM 250 and/or some or all of the SMs 260 in mid-air in 3D alignment in correlation to an object, person, or landscape for which the user wishes to capture an image and/or video of. Such functionality may make use of the sensing unit 282 to enables dynamic proximity sensing capabilities of the DPCM 250 and/or SMs 260 with respect to the object or UI 220. Furthermore, the AI camera controller 284 may assist in positioning and orienting the PSMs 264, such as an LED flash, to be properly positioned and oriented based on a contextual need of lighting (e.g., environmental lighting, angular lightning, intensity of light, top-down lighting, etc.) The AI camera controller 284 may take into consideration any potential down-time or shutdown of the camera modules (due to battery, connectivity, or other issues). Furthermore, the display device 228 or other user interface output 226, such as user smart wearables, may alert the user for any potential rearrangement of display placement, or holding or gripping pattern, thus enabling optimum detachment and reattachment of the camera module(s) 250, 260.

According to a re-attachment protocol, once the desired photographic objectives have been achieved (or, alternately, in response to a user command, an AI camera controller 284, or error condition or shut down of components like a battery, loss of communications, etc.), the individual SMs 260 may be positioned for re-attachment and then actually re-attached to one another to form the single unit DPCM 250. Then, the DPCM 250 may attach to the camera system 200, e.g., via the camera enclosing socket unit 230. In some embodiments, the SMs 260 may individually attach and re-attach to the camera system 200 without requiring all of the SMs 260 to do so.

The AI camera controller 284 may itself learn and build its own picture quality enhancements using previous pictures and various known machine learning algorithms. Other AI and MI features that the AI camera controller 284, the DPCM 250, and the SMs 260 combination of floating camera's may use include any or all of the following: DeepExposure, pixel binning, auto focus detection, image histogram, RGB image, and TrueDepth.

The AI camera controller 284 may be located exclusively on the camera system 200, or may be spread across the DPCM 250 and the SMs 260. The DPCM 250 and/or SMs 260 may relay individual images or shots to the camera system 200, and particularly to the screen display 228. The AI enabled camera units 250, 260 may dynamically enhance the image based on context, user preferences, and captured images or videos.

Figure 3:
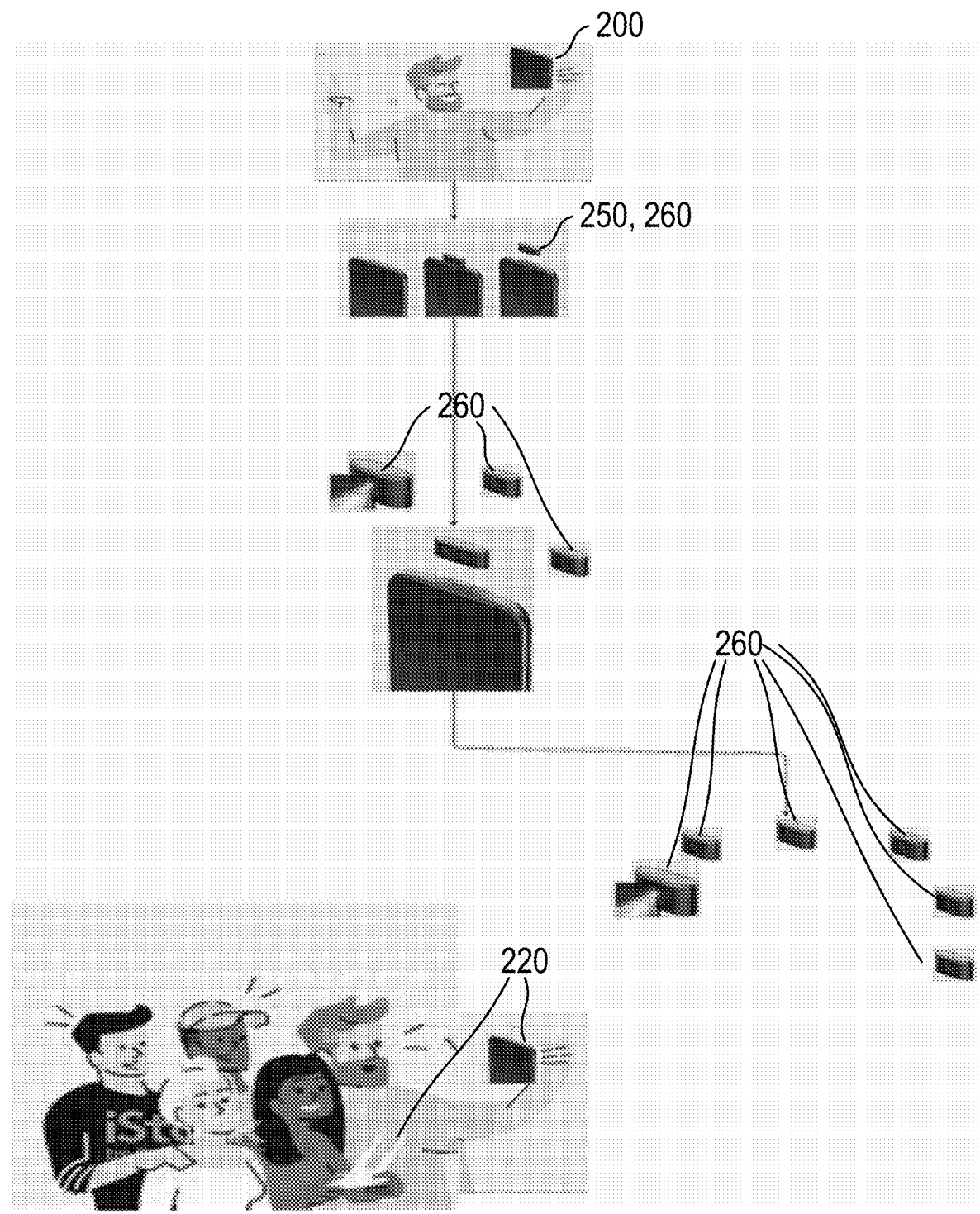
FIG. 3 is a pictorial diagram of the camera system in use, according to some embodiments.

FIG. 3 is a pictorial illustration of use of the camera system 200 described herein, according to some embodiments. A user decides to take an image using the camera system 200 described above. The DPCM/SM detach/re-attach controller 276, possibly in conjunction with other modules, determines that a group photograph is intended, given, e.g., the immediate proximity of others near the user, and further determines that the DPCM 250, in its current location, does not have an adequate field of view to capture everyone, and thus, it decides to detach.

Since this particular camera system has a DPCM 250 that is comprised of SMs 260, the system may determine that the best group photo may be obtained by the DPCM 250 splitting into its constituent SMs 260. The image(s) or video(s) are subsequently captured by the SMs 260 as a lighting SM provides illumination. Not shown are the SMs 260 re-attaching to form the DPCM 250, and the DCPM 250 re-attaching.

Figure 4:
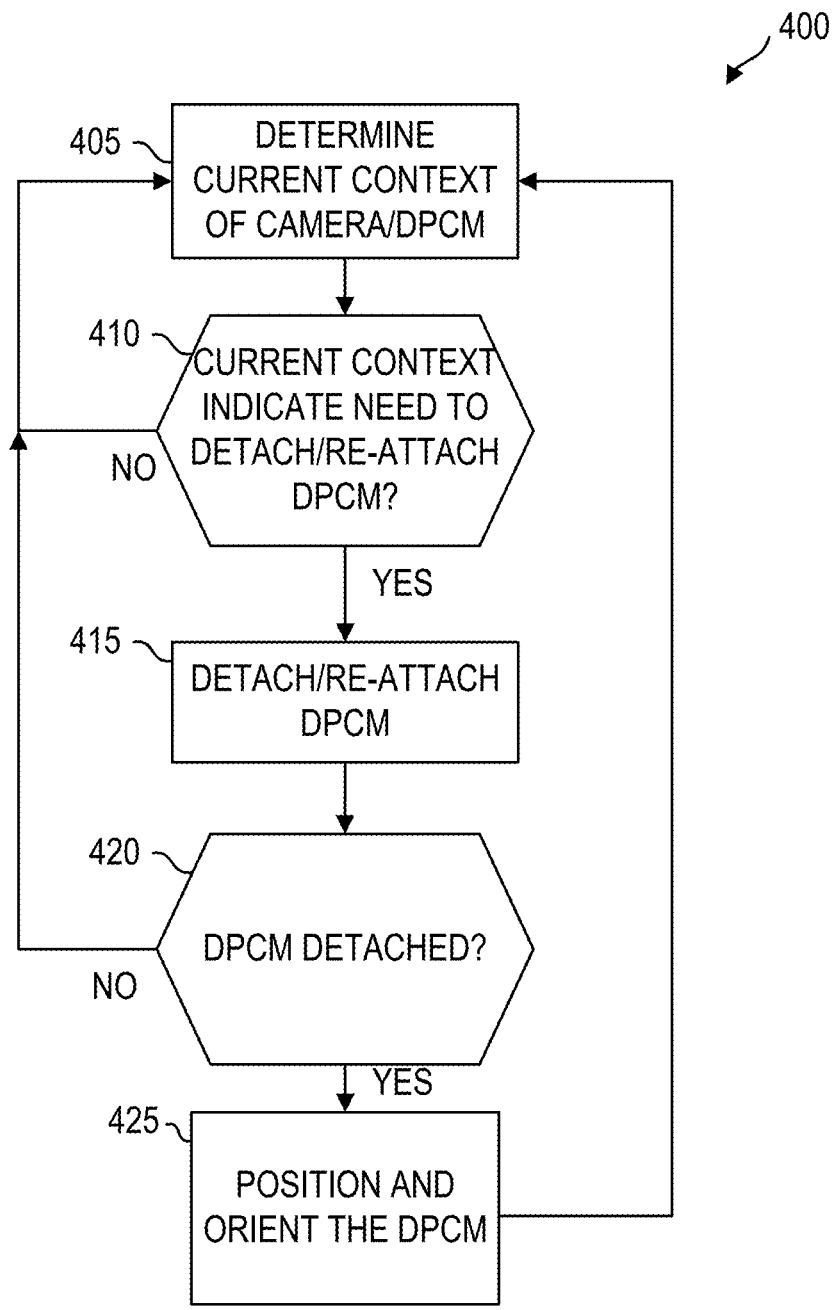
FIG. 4 is a flowchart of an example process for operating the camera system, according to some embodiments.

FIG. 4 is a flowchart illustrating a process 400 that the camera system 200 may use to operation. In this case, in operation 405, the context determiner 280 may determine a particular context of the camera system 200 or the DPCM 250. In operation 410, the context determiner 278, possibly working with other controllers/modules, may determine whether there is a need to detach or re-attach to the CSI 210. If not (410:N), then the process may return to operation 405 to monitor the current situation.

If there is a need to detach or re-attach the DPCM 250, then the appropriate signals are sent to the DPCM 250 via the CI 240, and the DPCM 250 responds, in operation 415 by automatically performing the request detachment or reattachment. In operation 420, if the DPCM is not detached (420:N), then the monitoring of the current context continues in operation 405. Otherwise (420:Y), in operation 425, the DPCM 250 may be positioned and orientated according to the needs of the current context 425, and the current context monitoring 405 may be resumed.

What is claimed is:

1. A camera system, comprising:
  a camera system interface (CSI), comprising:
    a user interface for receiving user input from a user, and providing user output to a user; and
    a communication interface;
  a detachable positionable camera module (DPCM) comprising a lens and an image sensor that is physically detachable and re-attachable from the CSI and is independently positionable from the CSI in three-dimensional space and orientable about multiple axes when detached;
  wherein:
    the DPCM is automatically detachable from the CSI based on a current context that triggers detachment or re-attachment of the DPCM from or to the CSI.

2. The camera system of claim 1, further comprising:
  a context determiner that generates at least a part of the current context that triggers the detachment and re-attachment of the DPCM and that is based on sensed information.

3. The camera system of claim 1, wherein the CSI comprises a camera enclosing socket unit to/from which the DPCM re-attaches/attaches.

4. The camera system of claim 3, wherein the camera enclosing socket unit comprises a battery charger that is configured to recharge a battery of the DPCM when it is attached to the camera enclosing socket unit.

5. The camera system of claim 1, wherein the DPCM comprises a plurality of sub-modules (SMs) that are detachable/re-attachable to at least one of: a) the DPCM when the DPCM is physically detached from the CSI, and b) the CSI when the PDCM is physically attached to the CSI, wherein the SMs are independently controllable at least regarding position and orientation.

6. The camera system of claim 5, wherein the SMs comprise a camera SM (CSM) and a peripheral SM (PSM) that supports a camera but does not include a camera.

7. The camera system of claim 6, wherein:
  the CSM comprises a lens and an image sensor; and
  the PSM is selected from the group consisting of an illumination source, a flash, and a battery.

8. The camera system of claim 1, wherein the current context is at least partially determined by data received from a user interface UI, the UI comprising:
  an input comprising an element selected from the group consisting of a control grip, a touch screen, a gesture reader, a keyboard, and sensors, touch screen, joystick, wheels, and sensors; and
  an output comprising a display screen.

9. The camera system of claim 8, wherein the control grip is usable for detachment, re-attachment, position, and orientation.

10. The camera system of claim 1, further comprising camera system logic that includes:
  a DPCM position controller that controls a position of at least one of the DPCM and an SM;
  a DPCM detachment/re-attachment controller that controls an automated detachment and re-attachment of at least one of the DPCM and an SM from the camera system interface or another SM;
  a DPCM feedback and imaging controller that controls the imaging of and receives feedback from at least one of the DPCM and an SM;
  a context determiner that determines a current context of at least one of the DPCM and an SM; and
  a sensing unit that provides information used by the context determiner.

11. The camera system of claim 1, further comprising a context determiner that provides a situation awareness used to determine whether to detach or reattach the DPCM.

12. The camera system of claim 11, wherein the context determiner utilizes an aspect selected from the group consisting of need for a flash, camera lens particulars, field of view, background to be covered in an image frame, and blind spots.

13. The camera system of claim 12, wherein the context determiner further utilizes a user's intent.

14. The camera system of claim 1, further comprising an artificial intelligence (AI) camera controller.

15. The camera system of claim 14, wherein the AI camera controller is configured to, in conjunction with a context determiner, cure vibration, stabilize an image, correct for mid-air wind movements, or provide alerts.

16. The camera system of claim 14, wherein the AI camera controller is configured to:
  learn and build picture quality enhancements;
  incorporate one or more of: DeepExposure, pixel binning, auto focus detection, image histogram, RGB image, and TrueDepth; and
  enable mid-air synchronization based on image capture need and situational awareness.

17. The camera system of claim 1, further comprising a feedback and imaging controller configured to:
  monitor imaging information provided by the DPCM or SMs when detached, including at least one of focal length, aperture, and shutter speed; and
  adjust a DPCM or SM camera parameter based on the monitored imaging information.

18. A method for operating a camera system, comprising:
  determining a current context of a camera system comprising a camera system interface (CSI) and a detachable positionable camera module (DPCM) comprising a lens and an image sensor that is physically detachable and re-attachable from the CSI and is independently positionable from the CSI in three-dimensional space and orientable about multiple axes when detached;
  conditioned upon the current context, automatically detaching or re-attaching the DPCM from or to the CSI; and
  conditioned upon the DPCM being detached from the CSI, positioning and orienting the DPCM independently of the CSI.

19. The method of claim 18:
  wherein the DPCM comprises a plurality of sub-modules (SMs) that are detachable/re-attachable to at least one of: a) the DPCM when the DPCM is physically detached from the CSI, and b) the CSI when the PDCM is physically attached to the CSI, and the SMs comprise a camera SM (CSM) and a peripheral SM (PSM) that supports a camera but does not include a camera;
  the method further comprising independently controlling a position and orientation of the SMs.

20. A computer program product for a camera system, the computer program product comprising:
  one or more non-transitory computer readable storage media, and program instructions collectively stored on the one or more non-transitory computer readable storage media, the program instructions comprising program instructions to:
  determine a current context of a camera system comprising a camera system interface (CSI) and a detachable positionable camera module (DPCM) comprising a lens and an image sensor that is physically detachable and re-attachable from the CSI and is independently positionable from the CSI in three-dimensional space and orientable about multiple axes when detached;
  conditioned upon the current context, automatically detach or re-attach the DPCM from or to the CSI; and
  conditioned upon the DPCM being detached from the CSI, position and orient the DPCM independently of the CSI.

* * * * *